United States Patent [19]

Blount

[11] 4,273,908
[45] Jun. 16, 1981

[54] PROCESS FOR THE PRODUCTION OF POLY (POLYISOCYANATE-POLYOL-ALKALI METAL SILICATE SOLID

[76] Inventor: David H. Blount, 5450 Lea St., San Diego, Calif. 92105

[21] Appl. No.: 146,474

[22] Filed: May 5, 1980

Related U.S. Application Data

[63] Continuation-in-part of Ser. No. 36,350, May 7, 1979, which is a continuation-in-part of Ser. No. 889,932, Mar. 27, 1978, abandoned, which is a continuation-in-part of Ser. No. 663,924, Mar. 4, 1976, Pat. No. 4,097,424, which is a continuation-in-part of Ser. No. 599,000, Jul. 7, 1975, Pat. No. 4,072,637, which is a continuation-in-part of Ser. No. 262,485, Jun. 14, 1972, abandoned, which is a continuation-in-part of Ser. No. 71,628, Sep. 11, 1970, abandoned.

[51] Int. Cl.$^3$ ................................................ C08J 9/00
[52] U.S. Cl. .......................................... 528/44; 260/9; 260/17.4 CL; 260/37 SB; 260/37 EP; 260/37 N; 260/37 M; 521/50; 521/100; 521/125; 521/126; 521/127; 521/129; 521/154; 528/26; 528/28; 528/29; 528/53; 528/57; 528/58; 528/76; 528/425; 525/453; 525/425; 525/474; 525/476; 525/479

[58] Field of Search ............... 521/154, 100, 125, 126, 521/127, 129, 50; 528/425, 28, 29, 26, 44, 46, 53, 57, 58, 76, 474, 476, 479; 260/9, 17.4 CL, 17.4 SG, 37 SB, 37 EP, 37 N, 37 M

[56] References Cited

U.S. PATENT DOCUMENTS

| | | | |
|---|---|---|---|
| 3,354,099 | 11/1967 | Stegeman | 521/100 |
| 3,923,311 | 12/1975 | Tashlick | 285/284 |
| 3,977,889 | 8/1976 | Shearing | 521/100 |
| 4,072,637 | 2/1978 | Blount | 521/121 |
| 4,097,422 | 6/1978 | Markusch | 521/154 |
| 4,097,423 | 6/1978 | Dieterich | 521/154 |
| 4,097,424 | 6/1978 | Blount | 521/154 |
| 4,105,594 | 8/1978 | Dieterich | 521/100 |
| 4,129,696 | 12/1978 | Markusch et al. | 521/154 |
| 4,136,238 | 1/1979 | Hilterhaus | 521/154 |
| 4,142,030 | 2/1979 | Dieterich et al. | 521/100 |
| 4,153,764 | 5/1979 | Blount | 528/44 |
| 4,159,369 | 6/1979 | Blount | 528/425 |

FOREIGN PATENT DOCUMENTS

| | | | |
|---|---|---|---|
| 1192864 | 5/1970 | United Kingdom | 521/100 |
| 1443136 | 7/1976 | United Kingdom | 521/100 |

*Primary Examiner*—Morton Foelak

[57] ABSTRACT

Poly (polyisocyanate-polyol-alkali metal silicate) solid or foamed products are produced by mixing a dry granular alkali metal silicate with a polyol while heating to form an emulsion which is then reacted with an organic polyisocyanate.

23 Claims, No Drawings

PROCESS FOR THE PRODUCTION OF POLY (POLYISOCYANATE-POLYOL-ALKALI METAL SILICATE SOLID

CROSS-REFERENCE TO RELATED APPLICATIONS

This application is a continuation-in-part of my copending U.S. patent application Ser. No. 036,350, filed May 7, 1979, which is a continuation-in-part of my copending U.S. patent application Ser. No. 889,932, filed Mar. 27, 1978, now abandoned which is a continuation-in-part of my earlier U.S. patent application Ser. No. 663,924, filed Mar. 4, 1976, now U.S. Pat. No. 4,097,424, which is a continuation-in-part of my earlier U.S. patent application Ser. No. 599,000, filed July 7, 1975, now U.S. Pat. No. 4,072,637, which is a continuation-in-part of my earlier U.S. patent application Ser. No. 262,485, filed June 14, 1972, now abandoned, which is a continuation-in-part of my earlier U.S. patent application Ser. No. 71,628, filed Sept. 11, 1970, now abandoned.

BACKGROUND OF THE INVENTION

This invention relates to a process for the production of poly (polyisocyanate-polyol-alkali metal silicate) solid or foamed product by reacting an emulsion of an alkali metal silicate compound in a polyol with an organic polyisocyanate or polyisothiocyanate.

The products produced by this process may be quite varied in physical properties; they may be solid or porous, rigid or elastomine, and the porous products may be rigid or soft and flexible and is an improvement over previously produced poly (polyisocyanate-polyol-alkali metal silicate) products.

This process has an advantage over previous processes in that it may be used in many of the present polyurethane foaming machine. Two liquid components may be used to produce the foamed product.

The products produced by this invention may be utilized as sound and thermal insulating material, for shock-resistant packaging, as cushions, as floation material in boats, as fiber, as coating agents for wood and metal, as adhesives, as fillers, as impregnating agents, as casting material, as putty material, as constructional components of a building, etc. The products are novel, economical and have improved heat and flame resistant properties.

The poly (polyisocyanate alkali metal silicate) solid or foamed products are produced by reaction the following components:

Component (a) An emulsion of an alkali metal silicate which contains only water which is attached to the alkali metal silicate molecule in a polyol.
Component (b) An organic polyisocyanate or polyisothiocyanate.

Component (a)

The improvement in the invention comprises the process in producing the component (a) which may be utilized in a two component systems to produce improved poly(polyisoisocyanate-polyol-alkali metal silicate) products.

An emulsion of an alkali metal silicate in a polyol may be produced by mixing up to about equal parts by weight of a fine granular alkali metal silicate and a polyol then heating the mixture to 40° to 120° C. while agitating for 10 to 60 minutes thereby producing an emulsion. Optionally an emulsifying agent may be added to assist in emulsifying the mixture. Initiators, fillers, salt producing agents, foam stabilizers, flame retardants, diluents and other additives may be added to the emulsion. The alkali metal silicate may settle out of the emulsion but may easuly be re-emulsified by agitating while heating.

The emulsified alkali metal silicate in a polyol is an improvement over using an aqueous solution of an alkali metal silicate by the fact that when an aqueous solution of an alkali metal silicate is used the water reacts with polyisocyanate instead of the alkali metal silicate reacting with the polyisocyanate where as when an emulsion of an alkali metal silicate in which the water present is attached to the alkali metal silicate in a polyol is used the polyisocyanate reacts with the alkali metal silicate and polyol to produce a poly (polyisocyanate-polyol-alkali metal silicate) solid or foamed product and sodium carbonate.

An excess of alkali metal silicate may be used which will give the poly (polyisocyanate-polyol-alkali metal silicate) solidor foamed product excellent flame resistance and may act as a filler also.

The alkali metal silicate such as sodium metasilicate pentahydrate which has the water attached to the sodium metasilicate molecule may be heated to above its melting point and is converted to a liquid state and may then be emulsified with a polyol at ambient temperature and even in the liquid state the water is attached to the sodium silicate molecule and no free water is present.

Any suitable alkali metal silicate may be used in this invention such as sodium, potassium and lithium silicates. The alkali metal silicate is preferred to be in a dry fine granular form. Sodium metasilicate pentahydrate is the preferred alkali metal silicate.

Any suitable alkali metal metasilicate in a liquid state which has less than five molecule of water attached to the alkali metal metasilicate molecule may be used in this invention to produce the emulsion of an alkali metal silicate in a polyol. The suitable alkali metal metasilicate which contains less than five molecules of water attached to the alkali metal silicate molecule may be produced by the same process in which the dry granular alkali metal metasilicate is produced by not crystalizing the alkali metal metasilicate and leaving it in a liquid state contains only water that is bound to the alkali metal silicate molecule.

Emulsion of an alkali metal silicate containing less than five molecules of water attached to each molecule of the alkali metal silicate in a polyol may also be produced by mixing an aqueous solution of an alkali metal silicate with a polyol to form an emulsion then evaporate the water by heating until only five molecules or less of water per molecule of the alkali metal silicate remains which are attached to the alkali metal silicate molecule; no free water should be present.

Any suitable conventional organic compounds with a molecular weight of, generally, from about 200 to about 10,000 which contain at least two hydrogen atoms capable of reacting with isocyanates, may also be used. While compounds which contain amino groups, thiol groups, carboxyl groups or silicate groups may be used, it is preferred to use organic polyhydroxyl compounds(-polyols), in particular, compounds which contain from 2 to 8 hydroxyl groups, especially those with a molecular weight of from about 800 to about 10,000 and preferably from about 1,000 to about 6,000, e.g., polyesters, polyethers, polythioethers, polyacetals, polycarbonates or polyester amides containing at least 2, generally from 2 to 8, but preferably dihydric alcohols, with the optional addition of trihydric alcohols, and polybasic, preferably dibasic, carboxylic acids. Instead of the free polycarboxylic acids, the corresponding polycarboxylic acid anhydrides or corresponding polycarboxylic acid esters of lower alcohols or their mixtures may be used for preparing the polyesters. The polycarboxylic acid may be aliphatic, cycloaliphatic, aromatic and/or heterocyclic and may be substituted, e.g., with halogen atoms and may be unsaturated; examples include: succinic acid, adipic acid, sebacic acid, suberic acid, azelaic acid, phthalic acid, phthalic acid anhydride, isophthalic acid, tetrahydrophthalic acid anhydride, trimellitic acid, hexahydrophthalic acid anhydride, tetrachlorophthalic acid anhydride, endomethylene tetrahydrophthalic acid anhydride, glutaric acid anhydride, fumaric acid, maleic acid, maleic acid anhydrige, dimeric and trimeric fatty acid such as oleic acid, optionally mixed with monomeric fatty acids, dimethylterephthalate and bis-glycol terephthalate. Any suitable polyhydric alcohol may be used such as, for example, ethylene glycol; propylene-1-2 and -1,3-glycol; butylene-1,4- and 2,3-glycol; propylene-1,2- and -1,3-glycol; butylene-1,4- and -2,3-glycol; hexane-1,6-diol; octane-1,8-diol; neopentyl glycol; cyclohexanedimethanol-1(1,4-bis-hydroxymethylcyclohexane); 2-methylpropane-1,3-diol; glycerol; trimethylol propane; pentaerythritol; quinitol; mannitol and sorbitol; methyl glycoside; diethylene glycol; triethylene glycol; tetraethylene glycol; polyethylene glycols; dipropylene glycol; polypropylene glycols; dibutylene glycol and polybutylene glycols. The polyesters may also contain a proportion of carboyxl end groups. Polyesters of lactones, such as ϵ-caprolactone, or hydroxycarboxylic acid such as W-hydroxycaproic acid, may also be used.

The polyethers with at least 2, generally from 2 to 8 and preferably 2 or 3, hydroxyl groups used according to the invention are known and may be prepared, e.g., by the polymerization of epoxides, e.g., ethylene oxide propylene oxide, butylene oxide, tetrahydrofurane oxide, styrene oxide or epichlorohydrin, each with itself, e.g., in the presence of $BF_3$, or by addition of these epoxides, optionally as mixtures or successively, to starting components which contain reactive hydrogen atoms such as alcohols or amines, e.g., water, ethylene glycol; propylene-1,3- or-1,2-glycol; trimethylol propane; 4,4-dihydroxydiphenylpropane, aniline, ammonia, ethanolamine or ethylenediamine; sucrose polyethers such as those described, e.g., in German Auslegeschriften Nos. 1,176,358 and 1,064,938, may also be used according to the invention. If is frequently preferred to use polyethers which contain predominantly primary OH groups (up to 90% by weight, based on the total OH groups contained in the polyether). Polyethers modified with vinyl polymers such as those which may be obtained by polymerizing styrene or acrylonitrites in the presence of polyethers, (U.S. Pat. Nos. 3,383,351; 3,304,273; 3,523,093 and 3,110,695; and German Pat. No. 1,152,536) and polybutadienes which contain OH groups are also suitable.

By "polythioethers" are meant, in particular, the condensation of thiodiglycol with itself and/or with other glycols, dicarboxylic acids, formaldehyde, aminocarboxylic acids or amino alcohols. the products obtained are polythio-mixed ethers or polythioether ester amides, depending on the co-component.

The polyacetals used may be, for example, the compounds which may be obtained from glycols, 4,4'-dihydroxydiphenyl-methylmethane, hexanediol, and formaldehyde. Polyacetals suitable for the invention may also be prepared by the polymerization of cyclic acetals.

The polycarbonates wtih hydroxyl groups used may be of the kind, e.g., which may be prepared by reaction diols, e.g., propane-1, 3-diol; butane-1, 4-diol; and/or hexane-1,6-diol or diethylene glycol, triethylene glycol or tetraethylene glycol, with diarylcarbonates, e.g., diphenylcarbonates or phosgene.

The polyester amides and polyamides include, e.g., the predominantly linear condensates obtained from polyvalent saturated and unsaturated carboxylic acids or their anhydrides, any polyvalent saturated and unsaturated amino alcohols, diamines, polyamines and mixtures thereof.

Polyhydroxyl compounds which contain urethane or urea groups, modified or unmodified natural polyols, e.g., castor oil, carbohydrates and starches, may also be used. Additional products of alkylene oxides with phenol formaldehyde resins or with urea-formaldehyde resins are also suitable for the purpose of the invention.

Organic hydroxyl silicate compound as produced in U.S. Pat. No. 4,139,549 may also be used in this invention.

Examples of these compounds which are to be used according to the invention have been described in High Polymers, Volume XVI, "Polyurethane, Chemistry and Technology", published by Saunders-Frisch Interscience Publishers, New York, London, Volume I, 1962, pages 32 to 42 and pages 44 to 54, and Volume II, 1964, pages 5 and 16 and pages 198 and 199; and in Knuststoff-Handbuch, Volume VII, Vieweg-Hochtlen, Carl-Hanser-Verlag, Munich, 1966, on pages 45 to 71.

Component (b)

Any suitable organic polyisocyanate may be used according to the invention, including aliphatic, cycloaliphatic, aralphatic, aromatic and heterocyclic polyisocyanates and mixtures thereof. Suitable polyisocyanates which may be employed in the process of the invention are exemplified by the organic diisocyanates which are compounds of the general formula:

$$O=C=N-R-N=C=O$$

wherein R is a divalent organic radical such as an alkylene, aralkylene or arylene radical. Such suitable radicals may contain, for example, 2 to 20 carbon atoms. Examples of diisocyanates are:
tolylene diisocyanate,
p,p-diphenylmethane diisocyanate,
phenylene diisocyanate,
m-xylylene diisocyanate,
chlorophenylene diisocyanate,
benzidene diisocyanate,
naphthylene diisocyanate,
decamethylene diisocyanate,
hexamethylene diisocyanate,
pentamethylene diisocyanate,
tetramethylene diisocyanate,
thiodipropyl diisocyanate,
propylene diisocyanate,
ethylene diisocyanate.

Other polyisocyanates, polyisothiocyanates and their derivatives may be equally employed. Fatty diisocyanates are also suitable and have the general formula:

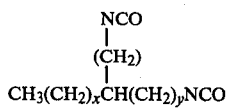

where x+y totals 6 to 22 and z is 0 to 2, e.g., isocyanastearyl isocyanate.

It is generally preferred to use commercially readily available polyisocyanates, e.g., tolylene-2,4- and -2,6-diisocyanate and any mixtures of these isomers ("TDI"), polyphenyl-polymethylene-isocyanates obtained by aniline-formaldehyde condensation followed by phosgenation ("crude MDI"), and modified polisocyanate containing carbodiimide groups, allophanate groups, isocyanurate groups, urea groups, imide groups, amide groups, or biuret groups, said modified polyisocyanates prepared by modifying organic polyisocyanates thermally or catalytically by air, water, urethanes, alcohols, amides, amines, carboxylic acids, or carboxylic acid anhydrides, phosgenation products of condensates of aniline or anilines alkyl-substituted on the nucleus, with aldehydes or ketones may be used in this invention. Solutions of distillation residues accumulating during the production or tolylene diisocyanates, diphenyl methane, diisocyanate, or hexamethylene diisocyanate, in monomerica polyisocyanates or in organic solvents or mixtures thereof may be used in this invention. Organic triisocyanates such as triphenylmethane triisocyanate may be used in this invention. Cycloaliphatic polyisocyanates, e.g., cyclohexylene-1,2-; cyclohexylene 1,4; and methylene-bis(cyclohexyl-4,4') diisocyanate may be used in this invention. Suitable polyisocyanates which may be used according to the invention are described, e.g., by W. Siefkin in Justus Liebigs Annalen der Chemie, 562, pages 75 to 136. Inorganic polyisocyanates are also suitable according to the invention.

Organic polyhydroxyl compounds (polyols) may be used in this invention with polyisocyanates or may be first reacted with a polyisocyanate to produce isocyanate-terminated polyurethane prepolymers and then also used in this invention.

Reaction products of from 50 to 99 mols of aromatic diisocyanates with from 1 to 50 moles of conventional organic compounds with a molecular weight of, generally, from about 200 to about 10,000 which contain at least two hydrogen atoms capable of reacting with isocyanates, may also be used. While compounds which contain amino groups, thiol groups, carboxyl groups or silicate groups may be used, it is preferred to use organic polyhydroxyl compounds, in particular, compounds which contain from 2 to 8 hydroxyl groups, especially those with a molecular weight of from about 800 to about 10,000 and preferably from about 1,000 to about 6,000, e.g., polyesters, polyethers, polythisethers, polyacetals, polycarbonates or polyester amides containing at least 2 generally from 2 to 8, but preferably dihydric alcohols, with the optional addition of trihydric alcohols, and polybasic, preferably dibasic, carboxylic acids. Instead of the free polycarboxylic acids, the corresponding polycarboxylic acid anhydrides or corresponding polycarboxylic acid esters of lower alcohols or their mixtures may be used for preparing the polyesters.

Examples of these compounds which are to be used according to the invention have been described in High Polymers, Volume XVI, "Polyurethane, Chemistry and Technology", published by Saunders-Frisch Interscience Publishers, New York, London, Volume I, 1962, pages 32 to 42 and pages 44 to 54, and Volume II, 1964, pages 5 and 16 and pages 198 and 199; and in Kunststoff-Handbuch, volume VII, Vieweg-Hochtlen, Carl-Hanser-Verlag, Munich, 1966, on pages 45 to 71.

If the polyisocyanates of the prepolymer which contains NCO groups have a viscosity above 2000 cP at 25° C., it may be advantageous to reduce the viscosity thereof by mixing it with a low-viscosity organic polyisocyanate and/or an inert blowing agent or solvent.

Inorganic polyisocyanates and isocyanate-terminated polyurethane silicate prepolymers may also be used in this invention.

Polyisocyanate curing agents and/or polyisocyanate activators (catalysts) may be used in the process of producing polyurethane silicon acid resinous or foamed products. The following are examples of polyisocyanate curing agents and activators:

1. Water.
2. Water containing 10% to 70% by weight of an alkali metal silicate, such as sodium and/or potassium silicate. Crude commercial alkali metal silicate may contain any substances, e.g., calcium silicate, magnesium silicate, borates and aluminates and may also be used. The molar ratio of $Me_2OSiO_2$ (Me=metal) is not critical and may vary within the usual limits, but is preferably between 4 to 1 and 0.2 to 1.
3. Water containing 20% to 50% by weight of ammonium silicate.
4. Water containing 5% to 40% by weight of magnesium oxide in the form of a colloidal dispersion.
5. Alkali metal metasilicate such as sodium metasilicate, potassium metasilicate and commercial dry granular sodium and potassium silicates. Heating is required to start the curing reaction.
6. Water containing 25% to 70% by weight of silica sol.
7. Activators (catalysts) which act as curing agents and are added to the polyurethane silicate prepolymer in the amount of 0.001% to 10% by weight. They may be added in water.
   (a) Tertiary amines, e.g., triethylamine; tributylamine; N-methyl-morpholine; N-ethylmorpholine; N,N,N',N'-tetramethylenediamine; 1,4-diazo-bicyclo-(2,2,2)-octane; N-methyl-N'-dimethylaminoethyl piperazine; N,N'dimethylbenzylamine; bis(N,N-diethylaminoethyl)-adipate; N,N-diethylbenzylamine; pentamethyldiethylenetriamine; N,N-diemthylcyclohexylamine; N,N,N',N'-tetramethyl-1,3-butanediamine; N,N-dimethyl-beta-phenylethylamine; and 1,2-dimethylimidaxole. Suitable tertiary amine activators which contain hydrogen atoms which are reactive with isocyanate groups include, e.g., triethanolamine; triisopanolamine; N,N-dimethylethanolamine; N-methyl-diethanolamine; N-ethyl-diethanolamine; and their reactive products with alkylene oxides, e.g., propylene oxide and/or ethylene oxide and mixtures thereof.
   (b) Organo-metallic compounds, preferably organotin compounds such as tin salts of carboxylic acid, e.g., tin acetate, tin octoate, tin ethyl hexoate, and tin laurate and the dialkyl tin salts of carboxylic acids, e.g., dibutyl tin diacetate, dibutyl tin dilaurate, dibutyl tin maleate or diocyl tin diacetate.

(c) Silaamines with carbon-silicon bonds as described, e.g., in British Pat. No. 1,090,589, may also be used as activators, e.g., 2,2,4-trimethyl-1,2-silamorpholine or 1,3-diethylaminoethyl-tetramethyldisiloxane.

(d) Other examples of catalysts which may be used according to the invention, and details of their action, are described in Kunststoff-handbuch, Volume VII, published by Vieweg and Hochtlen, Carl-Hanser-Verlag, Munich, 1966, e.g., on pages 96 and 102.

8. Water containing 1% to 10% by weight of bases which contain nitrogen such as tetraalky ammonium hydroxides.

9. Water containing 1% to 10% by weight of alkali metal hydroxides such as sodium hydroxide; alkali metal phenolates such as sodium phenolate or alkali metal alcoholates such as sodium methylate.

10. Water containing sodium polysulfide in the amount of 1% to 10% by weight.

11. Water containing 20% to 70% by weight of a water-binding agent, being capable of absorbing water to form a solid or a gel, such as hydraulic cement, synthetic anhydrite, gypsum or burnt lime.

12. Mixtures of the above-named curing agents.

Surface-active additives (emulsifiers and foam stabilizers) may also be used according to the invention. Suitable emulsifiers are, e.g., the sodium salts of ricinoleic sulphonates or of fatty acid, or salts of fatty acids with amines, e.g., oleic acid diethylamine or stearic acid diethanolamine. Other surface-active additives are alkali metal or ammonium salts of sulphonic acids, e.g., dodecylbenzine sulphonic acid or dinaphthyl methane disulphonic acid; or of fatty acids, e.g., ricinoleic acid, or of polymeric fatty acids.

The foam stabilizers used are mainly water-soluble polyester siloxanes. These compounds generally have a polydimethylsiloxane group attached to a copolymer of ethylene oxide and propylene oxide. Foam stabilizers of this kind have been described, e.g., in U.S. Pat. No. 3,629,308. These additives are preferably used in quantities of 0% to 20%, but preferably 0.01% to 20%, by weight, based on the reaction mixture.

Negative catalysts, for example, substances which are acidic in reaction, e.g., hydrochloric acid or organic acid halides, known cell regulator, e.g., paraffins, fatty alcohols or dimethyl polysiloxanes, pigments or dyes, known flame-retarding agents, e.g., tris-chloroethylphosphate or ammonium phosphate and polyphosphates, stabilizers against aging and weathering plasticizers, fungicidal and bacteriocidal substances and fillers, e.g., barium sulphate, kieselguhr, carbon black or whiting, may also be used according to the invention.

Further examples of surface additives, foam stabilizers, cell regulators, negative catalysts, stabilizers, flame-retarding substances, plasticizers, dyes, fillers and fungicidal and bacteriocidal substances and details about methods of using these additives and their action may be found in Kunststoff-Handbuch, Volume VI, published by Vieweg and Hochtlen, Carl-Hanser-Verlag, Munich, 1966, e.g., on pages 103 to 113. The halogenated paraffins and inorganic salts of phosphoric acid are the preferred fire-retarding agents.

When the curing agent is an aqueous solution of silicates, sodium silicate and/or potassium silicate in water which is normally known as water glass. Aqueous solutions of silicates may be prepared in the form of 25% to 54% silicates. Silica sols which may have an alkaline or acid pH may also be used; they should have solid contents of 15% to 50%. Silica sols are generally used in combination with aqueous silicate solutions. The choice of concentration depends mainly on the desired end product. Compact materials or materials with closed cells are preferably produced with concentrated silicated solutions which, if necessary, are adjusted to a lower viscosity by addition of alkali metal hydroxide. Solutions with concentrations of 40% to 70% by weight can be prepared in this way. On the other hand, to produce open-celled, light-weight foams, it is preferred to use silicate solutions with concentrations of 20% to 45% by weight in order to obtain low viscosities, sufficiently long reaction times and low unit weights. Silicate solutions with concentrations of 15% to 45% are also preferred when substantial quantities of finely divided inorganic fillers are used.

Suitable flame-resistant compounds may be used in the products of this invention such as those which contain halogen or phosphorus, e.g., tributylphosphate; tris(2,3-dichloropropyl)-phosphate; polyoxpropylenechloromethylphosphonate; cresgldiphenylphosphate; tricresylphosphate; tris-(beta-chloroethyl)-phosphate; tris-(2,3-dichloropropyl)-phosphate; triphenyl-phosphate; ammonium phosphate; perchloroinated diphenyl phosphate; perchlorinated terephenyl phosphate; hexabromocyclodecane; tribromophenol; dibromopropyldiene, hexabromobenzene; octabromodiphenylether; pentabromotoluol; poly-tribromostyrol; tris-(bromocresyl)-phosphate; tetrabromobis-phenol A; tetrabromophthalic acid anhydride; octabromodiphenyl phosphate; tri-(dibromopropyl)-phosphate; calcium hydrogen phosphate; sodium or potassium dihydrogen phosphate; disodium or dipotassium hydrogen phosphate; ammonium chloride; phosphoric acid; polyvinylchloride tetomers chloroparaffins as well as further phosphorus- and/or halogen-containing flame-resistant compounds as they are described in Kunststoff-Handbuch, Volume VII, Munich, 1966, pages 110 and 111, which are incorporated herein by reference. The organic halogen-containing components are, however, preferred in the polyurethane silicon acid products.

In the cases where the viscosity of the polyisocyanate is too high, it may be reduced by adding a low-viscosity isocyanate, or even by adding inert solvents, such as acetone, diethyl ether of diethylene glycol, ethyl acetate and the like.

In cases where the curing agent contains an aqueous alkali silicate, the isocyanate-terminated polyurethane prepolymer may be sulphonated. It is usually sufficient to react the isocyanate-terminated polyurethane prepolymer with concentrated sulphuric acid or oleum of sulfur trioxide in order to produce a sulphonated poly-(urethane silicate) prepolymer containing the sulphonic group in the amount of 3-100 milliequivalents/100 g. The reaction will take place by thoroughly mixing the sulphuric acid or oleum or sulfur trioxide with the isocyanate-terminated polyurethane prepolymer at ambient temperature and pressure. In some cases where sulfur trioxide is used, an increased pressure is advantageous. The polyisocyanate may be modified to contain ionic groups before reacting with the polyester-silicate resinous products.

The sulphonated isocyanate-terminated polyurethane prepolymer can be directly mixed with an aqueous silicate solution, in which case the corresponding metal salt is formed in sity. The sulphonated poly(urethane silicate) prepolymer may be completely or partly neutralized at the onset by the addition of animes, metal alcoholates, metal oxides, metal hydroxide or metal carbonates.

Water-binding components may be used in this invention, including organic or inorganic water-binding substances which have, first, the ability to chemically combine, preferably irreversibly, with water and, second, the ability to reinforce the poly(polyisocyanate-polyol-alkali metal silicate) products of the invention. The term "water-binding component" is used herein to identify a material, preferably granular or particulate, which is sufficiently anhydrous to be capable of absorbing water to form a solid or gel such as mortar or hydraulic cement.

A water-binding component such as hydraulic cement, synthetic anhydrides, gypsum or burnt lime may be added to any of the components to produce a tough, somewhat flexible solid or cellular solid concrete. The water-binding component may be added in amounts from 0–200% by weight, based on the weight of Components a and b. When a water-binding agent is added and when the curing agent is an aqueous alkali metal silicate solution, a halogen or phosphorous-containing compound or mixture thereof may be added in the amount of 1% to 30% by weight, based on the weight of the reactants, Components a and b.

Suitable hydraulic cements are, in particular, Portland cement, quick-setting cement, blast-furnace Portland cement, mildburnt cement, sulphate-resistant cement, brick cement, natural cement, lime cement, gypsum cement, pozzolan cement and calcium sulphate cement. In general, any mixture of fine ground lime alumina and silica that will set to a hard product by admixture of water, which combines chemically with the other ingredients to form a hydrate, may be used. There are many kinds of cement which can be used in the production of the compositions of the invention and they are so well known that a detailed description of cement will not be given here; however, one can find such a detailed description in Encyclopedia of Chemical Technology, Volume 4, Second Edition, Published by Kirk-Othmer, pages 684–710, of the type of cement which may be used in the production of this invention and are incorporated herein by reference.

Organic blowing agents may be used to improve or increase the foaming to product cellular solid plastics such as acetone, ethyl acetate, methanol, ethanol, halogenated alkanes, e.g., methylene chloride, chloroform, ethylidene chloride, vinylidene chloride, monofluorotrichloromethane, chlorodifluoromethane, butane, hexane or diethyl ether. Compounds which decompose at temperatures above room temperature with liberation of gases, e.g., nitrogen, such as azo compounds, azoisobutyric acid nitrile, may also act as blowing agents. Compressed air may act as a blowing agent. Other examples of blowing agents and details about the use of blowing agents are described in Kunststoff-Handbuch, Volume VII, published by Vieweg and Hochtlen, Carl-Hanser-Verlag, Munich, 1966, e.g., on pages 108 and 109, 453 to 455 and 507 to 510.

The proportions of the components may be adjusted to a highly cellular solid. When water is used, it reacts with the NCO group to produce $CO_2$ and pores are produced in the product by the evolved $CO_2$. In certain cases, the $CO_2$ is rapidly evolved and escapes before the product hardens, and a solid product can be produced, nearly completely free of air cells. When a high silicate content, from 80% to 99% by weight, is desirable, such as when the final product is required to have mainly the properties of an inorganic silicate plastic, in particular, high-temperature resistance and complete flame resistance, an alkali metal silicate may be added with Components a, or b or be reacted with the polyisocyanate to produce a polyurethane alkali metal silicate prepolymer. In that case, the function of the polyisocyanate is that of a non-volatile hardener whose reaction product is a high-molecular-weight polymer which reduces the brittleness of the product.

When an alkali catalyst or alkali metal silicate is used in the invention, fine metal powders, e.g., powdered calcium, magnesium, aluminum or zinc, may also act as the blowing agents by bringing about the evolution of hydrogen. Compressed air may be mixed in the components and may also be used to mix the components, then be used as the blowing agent. These metal powders also have a hardening and reinforcing effect. The properties of the foams are a cellular solid.

The improvement of this process over previous process comprises of using an emulsion of an alkali metal silicate which has five or less water molecules attached to the alkali-metal silicate and is capable of being emulsified with a polyol. The using of an alkali metal silicate with five or less water molecules attached to the alkali metal molecule in a polyol is an improvement over using an aqueous solution of an alkali metal silicate by the fact that the organic polyisocyanate can react with both the alkali metal silicate and polyol before the water bound by the alkali metal silicate is released to act as a blowing agent wherein when an aqueous solution of an alkali metal silicate is used the water reacts with the polyisocyanate, which release $CO_2$ which reacts with the alkali metal silicate to produce silicic acid which acts only as a filler in the form of a colloidal dispersion as illustrated in U.S. Pat. Nos. 4,097,423, 40052,347; 3,983,081; 4,057,519; 4,136,238; 3,975,316; 4,042,536 and others. In the improved process of this invention the reacting time is sufficient for the polisocyanate to react with both the polyol and alkali metal silicate to produce an improved product with high compression strength, good tear strength, excellent flame resistance and excellent accoustic and insulation properties.

The object of the present invention is to provide a novel process for producing poly(polyisocyanate-polyol-alkali metal) solid or foamed products. Another object is to provide a process which can product poly(-polyisocyanate-polyol-alkali metal) solid or foamed products by utilizing a two component system which can be used in the present polyurethane foaming machines. Another object is to produce relative low cost, light, weight, high strength, flame resistant foamed products which may be flexible, semi-flexible or rigid. Still another object is to produce novel poly(-polyisocyanate-polyol-alkali metal silicate) foamed products which may be used for packaging, for thermal and sound insulation, as adhesives, as coating for wood and metal, for structual purposes and as cavity filler.

SUMMARY OF THE INVENTION

The preferred method to produce the poly(-polyisocyanate-polyol-alkali metal silicate) solid or foamed product is to thoroughly mix component (a), an emulsion of an alkali metal silicate in a polyol optionally containing an initiator, filler, dilutent, blowing agent, water-binding agent, foam, emulsifying agent, and a foam stabilizer and component (b) an organic polyisocyanate or polyisothiocyanate optionally containing a blowing agent, dilutent, resinous extender, high-boiling aromatic ester plasticerizer and salt forming compounds, at 30° C. to 80° C. The mixture begins to react in 15 to 60 seconds thereby producing a poly(polyisocyanate-polyol-silicate) product.

This two component system may be used in many of the polyurethane foaming machines, especially machines which can heat the components to 30° to 80° C., also has an agitator to keep reactants well mixed and does not contain fine filters.

In an alternate method a poly(polyisocyanate-polyol-alkali metal silicate) prepolymer is produced by slowly mixing component (a) and component (b) at a temperature below 40° C., in amounts where an excess of isocyanate radical are present in the prepolymer, preferrable in an amount of 1 to 20 parts by weight of an alkali metal silicate with five or less of water molecules attached to the alkali metal silicate radical in 10 to 20 parts by weight of a polyol and using 50 to 99 parts by weight of an organic polyisocyanate. The prepolymer is cured with a curing agent or by the addition of component (a) using up to 178 parts by weight of component (a).

The proporations of the reactants and other compounds used in this invention may vary within the following ratio:

(a) 10 to 99 parts by weight of an alkali metal silicate and 50 to 99 parts by weight of a polyol, (b) 50 to 99 parts by weight of an organic polyisocyanate or polyisocyanate;

(c) 0.001% to 10% by weight of an initiator (catalyst), percentage based on weight of the component (a) and (b);

(d) up to 10% by of a curing agent, percentage based on the weight of the reaction mixture, components (a) and (b).

(e) up to 20% by weight of an emulsifying agent, percentage based on the weight of the reaction mixture, components (a) and (b).

(f) up to 20% by weight of a foam stabilizer, percentage based on the weight of the reaction mixture, components (a) and (b).

(g) up to 50% by weight of a filler, organic or inorganic particulate or pulverulent material, percentage based on the weight of the reaction mixture, components (a) and (b).

(h) up to 50% by weight of a blowing agent, boiling within the range from 25° to 80° C., percentage based on the weight of the reaction mixture, components (a) and (b).

(i) up to 200% by weight of a water-binding agent, percentage based on the weight of the reaction mixture, components (a) and (b).

(j) 1 to 20 parts by weight of component (a) with 99 parts by weight of component may be mixed and reacted to produce a poly(polyisocyanate-polyol-alkali metal silicate) prepolymer, (l) up to 20% by weight of a salt forming compound, percentage based on the weight of Compont (a).

The properties of the foams obtained from any given formulation, e.g., their density in the moist state, depends to some extent on the details of the mixing process, e.g., the form and speed of the stirrer and the form of the mixing chamber, and also the selected temperature at which foaming is started. The foams will usually expand 3 to 12 times their original volume.

The poly(polyisocyanate-polyol-alkali metal silicate) solid or foamed products produced by the invention have many uses. The reaction mixture, with or without a blowing agent, may be mixed in a mixing apparatus; then the reaction mixture may be sprayed by means of compressed air or by the airless spraying process onto surfaces; subsequently, the mixture expands and hardens in the form of a cellular solid which is useful for insulation, filling, and moisture-proofing coating. The foaming material may also be forced, poured or injection-molded into cold or heated molds, which may be relief molds or solid or hollow molds, optionally by centrifugal casting, and left to harden at room temperature or at temperatures up to 200° C., at ambient pressure or at elevated pressure. In certain cases, it may be necessary to heat the mixing or spraying apparatus to initiate foaming; then, once foaming has started, the heat evolved by the reaction between components continues the foaming until the reaction is complete, A temperature between 40° C. and 150° C. may be required to initiate foaming. The blowing agent is usually added to the polyisocyanate.

Reinforcing elements may quite easily be incorporated into the reaction mixtures. The inorganic and/or organic reinforcing elements may be, e.g., fibers, metal wires, foams, fabrics, fleeces or skeletons. The reinforcing elements may be mixed with the reaction mixtures, for example, by the fibrous web impregnation or by processes in which the reaction mixtures and reinforcing fibers are together applied to the mold, for example, by means of a spray apparatus. The shaped products obtainable in this way may be used as building elements, e.g., in the form of sandwich elements, either as such or after they have been laminated with metal, glass or plastics; if desired, these sandwich elements may be foamed. The products may be used as hollow bodies, e.g., as containers for goods which may be required to be kept moist or cool, as filter materials or exchanges, as catalyst carriers or carriers of other active substances, as decorative elements, furniture components and fillings or for cavities. They may be used in the field of model building and mold building, and the production of molds for metal casting may also be considered.

Instead of blowing agents, finely divided inorganic or organic hollow particules, e.g., hollow expanded beads of glass, plastics and straw, may be used for producing cellular or solid products. These products may be used as insulating materials, cavity fillings, packaging materials, building materials which have good solvent resistance and advantageous fire-resistant characteristics. They may also be used as lightweight building bricks in the form of sandwiches, e.g., with metal-covering layers for house building and the construction of motor vehicles and aircraft.

Organic or inorganic particles which are capable of foaming up or have already been foamed may be incorporated in the fluid foaming reaction mixture, e.g., expanded clay, expanded glass, wood, cork, popcorn, hollow plastic beads such as beads of vinyl chloride polymers, polyethylene, styrene polymers, or foam particles of these polymers or other polymers, e.g., polysulphone, polyepoxide, polyurethane, poly(urethane silicate) copolymers, urea-formadehyde, phenol-formaldehyde or polyimide polymers, or, alternatively, heaps of these particles may be permeated with foaming reaction mixtures to produce insulation materials which have good fire-resistant characteristics.

The cellular solid products of the invention, in the aqueous or dry or impregnated state, may subsequently be lacquered, metallized, coated, laminated, galvanized, vapor treated, bonded or blocked. The cellular solid products may be sawed, drilled, planed, polished, or other working processes may be used to produce shaped products. The shaped products, with or without a filler, may be further modified in their properties by subsequent heat treatment, oxidation processes, hot pressing, sintering processes or surface melting or other compacting processes.

The novel cellular solid products of the invention are also suitable for use as constructional materials due to their toughness and stiffness, yet they are still elastic. They are resistant to tension and compression and have a high dimensional stability to heat and high flame resistance. They have excellent sound-absorption capacity, heat-insulating capacity, fire resistance, and heat resistance which makes them useful for insulation. The cellular products of this invention may be foamed on the building site and, in many cases, used in place of wood or hard fiber boards. Any hollow foams may be used for foaming. The brittle foams may be crushed and used as a filler, as a soil conditioner, as a substrate for the propagation of seedlings, cuttings and plants or cut flowers.

The foamed or solid concrete produced by reacting the alkali metal silicate, polyol and polyisocyanate with a water-binding component may be used as surface coatings having good adhesion and resistance-to-abrasion properties, as mortars, and for making molded products, particularly in construction engineering and civil engineering such as for building walls, igloos, boats and for roadbuilding, etc. These products are light-weight, thermal-insulating materials with excellent mechanical properties and fire resistance. The amount of water-binding component used varies greatly, depending on the type of product desired, from 1% to 200% by weight, based on Components a and b and polyisocyanate. In certain cases, it is desirable to add sand and gravel in the amount of 1 to 6 parts by weight to each part by weight of the hydraulic cement. The mixture may be poured in place, troweled on or sprayed onto the desired surface to produce a solid or cellular solid product.

Fillers in the form of powders, granules, wire, fibers, dumb-bell shaped particles, crystallites, spirals, rods, beads, hollow beads, foam particles, non-woven webs, pieces of woven or knitted fabrics, tapes and pieces of foil of solid inorganic or organic substances, e.g., dolomite, chalk, alumina, asbestos, basic silicic acids, sand, talc, iron oxides, aluminum oxide and hydroxides, alkali metal silicates, zeolites, mixed silicates, calcium silicate, calcium sulphates, alumino silicates, cements, basalt wool or powder, glass fibers, carbon fibers, graphite, carbon black, Al-, Fe-, Cr- and Ag-powders, molybdenum sulphide, steel wool, bronze or copper meshes, silicon powder, expanded clay particles, hollow glass beads, glass powder, lava and pumice particles, wood chips, woodmeal, cork, cotton, straw, popcorn, coke or particles of filled or unfilled, foamed or unfoamed, stretched or unstretched organic polymers, may be added to the mixtures of the Components a and b in many applications. Among the numerous organic polymers which may be used, e.g., as powders, granules, foam particles, beads, hollow beads, foamable (but not-yet-foamed) particles, fibers, tapes, woven fabrics, or fleeces, the following may be mentioned as examples: polystyrene, polyethylene, polypropylene, polyacrylonitrile, polybutadiene, polyisoprene, polytetrafluorethylene, aliphatic and aromatic polyesters, melamine, urea, phenol resins, phenol silicate resins, polyacetals resins, polyepoxides, polyhydantoins, polyureas, polyethers, polyurethanes, polyimides, polyamides, polysulphones, polycarbonates and copolymers thereof.

The composite materials, according to the invention, may be mixed with considerable quantities of fillers without losing their advantageous properties, and, in particular, composite materials which consist predominantly of organic constituents which are preferably filled with inorganic fillers; where silicate constituents predominate, it is preferably filled with organic fillers. Fillers which are particularly preferred are chalk, talc, dolomite, gypsum, clay, anhydrite, glass, carbon and the conventional plastics and rubber waste.

In the production of surface coatings, bonds, putties or interlayers, particularly in the case of porous materials, it is preferred to use polyisocyanates which have only a low isocyanate content, e.g., less than 5%, or prepolymers which are free from isocyanate groups. The mixtures obtained in this way have a long pot life and may be applied in thin layers which gradually harden in the course of time. The liberated $CO_2$ acts as the curing agent. In a two-stage or multistage hardening in which, for example, in excess of water is used, there is a rapid evolution of $CO_2$ and the polyurethane silicon acid resinous product is converted into a workable form which may be used as putties, coating agents, grouting materials or mortar. This thermoplastic form may also be injection-molded, extruded or worked-up in a kneader.

In many cases, the poly(polyisocyanate-polyol-alkali metal silicate) resinous and foamed products produced by the invention are soluble in organic solvents and may be used as a tough coating agent for wood and metal. The mixtures of the invention are also suitable for use as impregnation agents for finishing fibers. The mixtures may also be extruded through dies or slots and converted into fibers and foils. These fibers and foils may be used for producing synthetic incombustible paper or fleeces.

When the emulsion of an alkali metal silicate in a polyol and polyisocyanate are combined with expanded clay a very good concrete is obtained which can, for example, be used as panels in the construction field. In this case, the foam material (expanded clay) plays the part of the binding material.

DESCRIPTION OF PREFERRED EMBODIMENTS

My invention will be illustrated in greater detail by the specific examples which follow, it being understood that these preferred embodiments are illustrative of but not limited to procedures which may be used in the production of poly(polyisocyanate-polyol-alkali metal silicate) solid or foamed products. Parts and percentages are by weight unless otherwise indicated.

EXAMPLE 1

Component (a)

About 100 parts by weight of sodium metasilicate pentahydrate and 100 parts by weight of polypropylene glycol (mol. wt. 400) are mixed then heated to 75° C. while agitating for about 10 minutes or until the sodium metasilicate melts then becomes emulsified in the polyol. About 5 parts by weight of triethylamine is added and thoroughly mixed in the emulsion.

Component (b)

About 200 parts by weight of "crude MDI" and 70 parts by weight of trichlorotrifluroethane are mixed.

Component (a) is heated to 45° C. to 55° C. while agitating then rapidly and thoroughly mixed with component (b), which is at ambient temperature. The mixture begins to expand in 15 to 30 seconds and within 1 to 3 minutes produces a semi-flexible poly(polyisocyanate-polyol-silicate) foam which weighs about 2 lbs. per cubic foot.

Other polyols may be used in place of polypropylene such as polyhydric alcohols, castor oil and polyester resins, polyether resins, polyamide resins, polycarbonates and polybutadienes which contain 2 or more hydroxyl groups and mixtures thereof.

EXAMPLE 2

Component (a)

About 100 parts by weight of sodium metasilicate pentahydrate, 50 parts by weight of polyethylene glycol (mol. wt. 380) and 10 parts by weight 4,4'-methylene dianiline produced by Upjohn Chemical Co. are mixed then heated to about 70° C. to 80° C. while agitating for about 10 minutes to 60 minutes or until the sodium metasilicate pentahydrates melts and forms an emulsion with the polyol.

Component (b)

About 200 parts by weight of MDI and 60 parts by weight of trichlorotrifluoroethane are thoroughly mixed.

Component (a) is heated to about 55° C. while agitating the mixed, then thoroughly mixed with component (b) which is at about 30° C. The mixture begins to expand in about 15 seconds. It expands to produce a tough rigid poly(polyisocyanate-polyol-alkali metal silicate) foamed product which weighs about 2 go 2.5 lbs. per cu. ft. The foam has excellent flame resistant properties.

EXAMPLE 3

Component (a)

About 100 parts by weight of potassium metasilicate pentahydrate and 150 parts by weight of a liquid sucrose amine polyether resin, ("Poly G 71-530" produced by Olin) are mixed then heated to 70° C. to 80° C. while agitating for about 10 to 60 minutes thereby producing an emulsion of the potassium metasilicate pentahydrate in the polyol.

Component (b)

150 parts by weight of crude MDI produced by Upjohn, 80 parts by weight of methylene chloride and 30 parts by weight of acetic acid are thoroughly mixed at about 40° C. to 50° C.

Components (a) and (b) are rapidly and thoroughly mixed and the mixture begins to expand in 15 to 45 seconds. The mixture expands to produce a tough ridid poly(polyisocyanate-polyol-alkali metal silicate) foamed product which weighs 2 to 2½ lbs. per cubic feet.

EXAMPLE 4

Component (a)

About 200 parts by weight of five granular sodium metasilicate pentahydrate, 50 parts by weight of polyethylene glycol (mol. wt. 380), 150 parts by weight of a surcose amine polyol ("Poly G 71-356" produced by Olin) and 5 parts by weight of sodium doctyl sulfosuccinate are mixed then heated to 70° C. to 80° C. while agitating for 10 to 60 minutes thereby producing an emulsion of the sodium metasilicate pentahydrate in the polyol.

Component (b)

About 200 parts by weight of methylene-di-p-phenylene diisocyanate and 70 parts by weight of trichlorotrifluoroethane are mixed then heated to about 60° C. to 70° C. while agitating.

Component (a) and (b) are rapidly and thoroughly mixed at about 60° to 70° C. and the mixture begins to expand in 15 to 60 seconds. The mixture expands to produce a tough rigid poly(poly-polyisocyanate-polyolalkali metal silicate) foamed product which weighs 2 to 3 lbs. per cubic foot.

EXAMPLE 5

Component (a)

About 150 parts by weight of fine granular sodium metasilicate pentahydrate, 5 parts by weight of triethylenediamine produced by Air Products, 4 parts by weight a sodium salt of ricinoleic acid and 170 parts by weight of polypropylene glycol (mol. wt. 1200) are mixed then heated to 70° C. to 80° C. while agitating for 10 to 60 minutes thereby producing an emulsion of the sodium metasilicate pentahydrate in the polyol.

Component (b)

About 200 parts by weight of toluene diisocyanate. "TDI", 50 parts by weight of fine granular hydrated silica and 10 parts by weight of sodium silicate are mixed then heated to 30° C. to 35° C. while agitating for about 20 minutes thereby producing a toluene diisocyanate silicate prepolymer. The prepolymer is mixed with 70 parts by weight of trichlorotrifluoroethane.

Components (a) and (b) are rapidly and thoroughly mixed at 40° C. to 50° C. and the mixture begins to expand in 15 to 60 seconds thereby producing a semi-rigid poly (polyisocyanate-polyol-alkali metal silicate) foamed product which expands to weigh about 2 lbs. per cubic feet.

EXAMPLE 6

Component (a)

About 50 parts by weight of polyethylene glycol (mol. wt. 380), 50 parts by weight of mannitol, 50 parts by weight of castor oil, 50 parts by weight liquid glyptal resin (3.8 mols of glycerol, 0.5 mol of phthalic anhydride, 2.5 mols of adipic acid), 50 parts by weight of a liquid polybutadiene resin with free OH groups ("Poly B-D R45M" produced by Arco Chemical Co.), 10 parts by weight of triethylamine, 150 parts by weight of potassium metasilicate pentahydrate, 50 parts by weight of fine granular silicic acid and 5 parts by weight of potassium doctyl sulfosuccanate are mixed then heated to 70° C. to 80° C. while agitating for 10 to 60 minutes thereby producing an emulsion of alkali metal silicate in a polyol.

Component (b)

About 300 parts by weight of "TDI" produced by Olin Chemical Co. are reacted with 50 parts by weight of ethylene glycol to produce a polyurethane prepolymer then the prepolymer is mixed with about 80 parts by weight of chloroform.

Components (a) and (b) are rapidly and thoroughly mixed with components (a) temperature at 45° to 55° C. and components (b) temperature is at ambient temperature. The mixture begins to expand in 15 to 30 seconds thereby producing a semi-rigid poly(polyisocyanate-polyol-alkali metal silicate) foamed product.

Other isocyanate-terminated polyurethane prepolymers may be used in place of the toluene diisocyanate-ethylene glycol propolymer such as:

(a) toluene diisocyanate with castor oil to produce a prepolymer having 22% NCO groups (b) toluene diisocyanate with a hydroxyl-group-containing polysulfide polymer to produce a prepolymer with an NCO content of about 20%

(c) methylene bis-phenyl diisocyanate with a liquid polyepichlorohydrin to produce a prepolymer of about 24% NCO content (d) diisocyanatodiphenylmethane with a tetra-functional polypropylene glycol (mol. wt. 500) to produce a prepolymer having about 22% NCO groups (e) 20% solution of a distillation residue of the distillation of commercial tolylene diisocyanate in a crude phosgenation product of an anilineformaldehyde condensation with an NCO of about 30%, with polyethylene glycol (mol. wt. 1000) to produce an isocyanate-terminated prepolymer with an NCO content of about 25%.

EXAMPLE 7

Component (a)

About 100 parts by weight of granular sodium metasilicate pentahydrate, 150 parts by weight of a polyether triol ("POLY G 30-56" produced by Olin Chemical Co.), 5 parts by weight of sodium doctyl sulfasuccinate and 10 parts by weight of 4,4-methylene dianiline produced by Upjohn are mixed then heated to 70° to 80° C. while agitating for 10 to 60 minutes thereby producing an emulsion of the alkali metal silicate in the polyol.

Component (b)

About 200 parts by weight of polymeric MDI produced by Upjohn are mixed with 70 parts by weight of trichlorotrifluoroethane.

Components (a) at about 55° C. and component (b) at ambient temperature are rapidly and thoroughly mixed. The mixture begins to expand in 15 to 60 seconds thereby producing a white flexible poly(polyisocyanate-polyolalkali metal silicate) foam product which weighs about 2 lbs. per cubic foot. The foam has excellent flame resistant properties.

EXAMPLE 8

Component (a)

About 50 parts by weight of sodium silicate, 100 parts weight of Portland cement, and 150 parts by weight of "POLY G 71-356" produced by Olin Chemical Co. are mixed then heated to 70° to 80° C. while agitating for 10 to 60 minutes thereby producing an emulsion of alkali metal silicate in a polyol.

Component (b)

About 100 parts by weight of Portland cement, 200 parts by weight of plaster's sand and 200 parts by weight of MDI ("PAPI 27" produced by Upjohn).

Components (a) and (b) are mixed thoroughly at about 35° to 45° C. and then poured into a mold of a concrete block. The mixture begins to expand in about 60 seconds and expands 6 to 10 times its original volume and is hard within 5 minutes to produce a tough rigid poly(poly-isocyanate-polyol-alkali metal silicate) foamed product. The foamed product is then soaked in water for about 2 to 5 minutes thereby producing a strong foamed concrete product which has excellent flame resistant and insulating properties.

Other water-binding agents may be used in place of Portland cement such as other hydraulic cements, synthetic anhydride, gypsum, burnt lime and mixtures thereof.

EXAMPLE 9

Component (a)

Component (a) as produced in Example 8.

Component (b)

About 100 parts by weight of hydrated silica, 100 parts by weight of Portland cement and 200 parts by weight of TDI are mixed then heated to 30° C. to 35° C. while agitating for about 20 minutes thereby producing a poly(tolylene diisocyanate silicate) prepolymer. The prepolymer is then mixed with 50 parts by weight of methylene chloride.

Component (a) at about 45° C. and component (b) at ambient temperature are rapidly and thoroughly mixed. The mixture expands 6 to 10 times its original volume to produce a rigid poly(polyisocyanate-polyol-alkali metal silicate) foamed product.

The foamed product is then wet with water to cure the cement.

EXAMPLE 10

Component (a)

About 10 parts by weight of sodium metasilicate pentahydrate is melted by heating to produce a liquid then cooled slowly to ambient temperature then mixed with 20 parts by weight of polypropylene glycol (mol. wt. 1200) to produce an emulsion.

Component (b)

100 parts by weight of TDI.

Component (a) is slowly added to component (b) at ambient temperature while agitating to keep the temperature below 40° C. thereby producing a poly(-polyisocyanate-polyol-alkali metal silicate) prepolymer.

The poly(polyisocyanate-polyol-alkali metal silicate) prepolymer is then cured when desired by mixing with the same amount of component (a) and allowing the temperature to go above 40° C. while agitating thereby producing a foamed poly(polyisocyanate-polyol-alkali metal silicate) product.

EXAMPLE 11

Component (a)

An aqueous solution containing 10 parts by weight of sodium silicate is mixed with 10 parts by weight of polyethylene glycol (mol. wt. average of 600) to form an emulsion then heated to above the boiling point of water while agitating until all free water is removed and only five or less molecules of water are attached to the alkali metal silicate molecule.

Component (b)

100 Parts by weight of MDI.

Component (a) is slowly added to component (b) at ambient temperature while agitating and keeping the temperature below 40° C. thereby producing a poly(polyisocyanate-polyol-alkali metal silicate) prepolymer.

About 15 parts by weight of a curing agent, an aqueous solution containing 30% sodicum silicate and 3 parts by weight of triethylamine, are thoroughly mixed with the poly(polyisocyanate-polyol-alkali metal silicate) prepolymer thereby producing a poly(polyisocyanate-polyol-alkali metal silicate) solid product.

EXAMPLE 12

Component (a)

About 5 parts by of a salt forming compound benzoic acid, is slowly added to 100 parts by weight component (a) produced in Example 3 while agitating at a temperature between 20° and 80° C. thereby producing a stable emulsion of the alkali metal silicate in a polyol at ambient temperature.

Component (b)

75 parts by weight of MDI.

Component (a) and (b) are mixed thoroughly at ambient temperature the within 15 to 60 seconds the mixture begins to slowly expand, it expands to produce a rigid poly(polyisocyanate-polyol-alkali metal silicate) foam which weighs about 2 to 2.5 pounds/cu. ft.

Other salt forming compounds may be used in place of benzoic acid such as mineral acid, organic acids, ammonium salts, e.g., ammonium chloride, monoammonium phosphate, etc., hydrogen containing acid salts e.g., sodium hydrogen sulfate, potassium hydrogen sulfate, sodium dihydrogen phosphate, etc., carboxylic anhydride, polycarboxylic anhydrides, phenols, polyfunctional alkylating agents e.g., 1,4-dibromobutane, p-xylylene-dichloride, etc.

Aromatic acids are the preferred salt forming compounds. Further examples of suitable polyfunctional alkylating agents may be found in Dutch Auslegischrift No. 67/03743. Further examples of acids may be found in German Pat. No. 1,178,583 and U.S. Pat. No. 3,480,592.

EXAMPLE 13

Component (a)

About 6 parts by weight of para-aminobenzoic acid is slowly added to 100 parts by weight of the component (a) produced in Example 11 while agitating thereby producing a stable liquid emulsion, then 5 parts by weight of triethylenediamine is added and thoroughly mixed in the emulsion.

Component (b)

60 Parts by weight of tolylene diisocyanate ("TDI"). Component (a) and (b) are thoroughly mixed at ambient temperature and the mixture begins to expand in 15 to to seconds, thereby producing a semi-flexible, white in color, poly(polyisocyanate-polyol-alkali metal silicate) foam which weighs about 2 pounds/cu. ft.

Although specific materials and conditions were set forth in the above examples, these were merely illustrative of preferred embodiments of my invention. Various other compositions, such as the typical materials listed above may be used, where suitable. The reactive mixtures and products of my invention may have other agents added thereto to enhance or otherwise modify the reaction and products.

Other modifications of my invention will occur to those skilled in the art upon reading my disclosure. These are intended to be included within the scope of my invention, as defined in the appended claims.

I claim:

1. The improved process for the production of poly(polyisocyanate-polyol-alkali metal silicate) products by mixing and reacting the following components:
   (a) the improvement comprises of producing an emulsion of an alkali metal silicate, which contains only water molecules that are attached to the alkali metal silicate,
   (b) an organic polyisocyanate or polyisothiocyanate.

2. The process of claim 1 wherein the alkali metal silicate is sodium metasilicate pentahydrate.

3. The process of claim 1 wherein the polyol is selected from the group of consisting of polyhydric alcohols, castor oil and polyester resins, polyether resins, polyester-amide resins, polycarbonates, polybutadeines, polythioethers, polycarbonates, which contain 2 or more hydroxyl groups and mixtures thereof.

4. The process of claim 1 wherein the polyisocyanate is selected from the group consisting of aliphatic, cycloalphatic, araliphatic, aromatic and heterocyclic polyisocyanates and mixtures thereof.

5. The process of claim 1 wherein the polyisocyanate is a phosgenation product of aniline-formaldehyde condensation and mixtures thereof.

6. The process of claim 1 wherein 0.001% to 10% by weight of an initiator, percentage is based on the weight of component (a) and (b), is added to the emulsion of alkali metal silicate in a polyol.

7. The process of claim 6 wherein the initiator is selected from the group consisting of tertiary amine, silaamines, organic-tin compounds and mixtures thereof.

8. The process of claim 1, wherein up to 10% by weight, percentage based on the reaction mixture, of a curing agent is added with component (a).

9. The process of claim 1, wherein up to 20% by weight, percentage based on the weight of the reaction mixture, of an emulsifying agent is added to the emulsion of an alkali metal in a polyol.

10. The process of claim 1, wherein organic or inorganic particulate or pulverulent materials are added to the reactive mixtures in the amount up to 50% by weight, percentage based on the weight of the reaction mixture, is added to the components.

11. The product produced by the process of claim 1.

12. The process of claim 1 wherein up to 200% by weight of an inorganic water-binding agent, percentage based on the weight of the reaction mixture, selected from the group consisting of hydraulic cement, synthetic anhydride, gypsum or burnt lime and is added with the polyisocyanate, and/or emulsion of an alkali metal silicate in a polyol.

13. The product produced by the process of claim 12.

14. The process of claim 1 wherein an isocyanate-terminated polyurethane prepolymer is utilized in place of the organic polyisocyanate.

15. The process of claim 1 wherein an isocyanate-terminated polyurethane prepolymer is selected from the group consisting of an isocyanate-terminated polyester, isocyanate-terminated polyether, isocyanate-terminated polybutadiene, isocyanate-terminated polysulfide and mixtures thereof.

16. The produce produced by the process of claim 14.

17. The process of claim 1 wherein the reactants are added in the following proportions:
Component (a) 10 to 99 parts by weight of an alkali metal silicate and 50 to 99 parts by weight of a polyol;
Component (b) 50 to 99 parts by weight of a polyisocyanate or polyisothiocyanate.

18. The process of claim 1 wherein a polyisocyanate silicate prepolymer produced by reacting an organic polyisocyanate with hydrated silica in the ratio of 50 parts by weight of the polyisocyanate to 5 to 20 parts by weight of hydrated silica, is used in place of the organic polyisocyanate or polyisothiocyanate.

19. The product produced by the process of claim 18.

20. The improved process of claim 1 wherein a poly (polyisocyanate-polyol-alkali metal silicate) prepolymer is produced by mixing and reacting 1 to 20 parts by weight of component (a) with 99 parts by weight of component (b) at a temperature below 40° C. thereby producing a poly(polyisocyanate-polyol-alkali metal silicate) prepolymer which is cured by mixing and reacting up to 178 parts by weight of component (a) thereby producing a poly(polyisocyanate-polyol-alkali metal silicate) product.

21. The product produced by the process of claim 20.

22. The process of claim 20 wherein the reaction is accompanied by foaming.

23. The process of claim 1 wherein up to 20% by weight of a salt forming compound is added and reacted with the alkali metal silicate thereby stabilizing the emulsion.

* * * * *